Oct. 5, 1954   J. CALLING ET AL   2,690,940
PISTON ASSEMBLY
Original Filed July 13, 1949   2 Sheets-Sheet 1
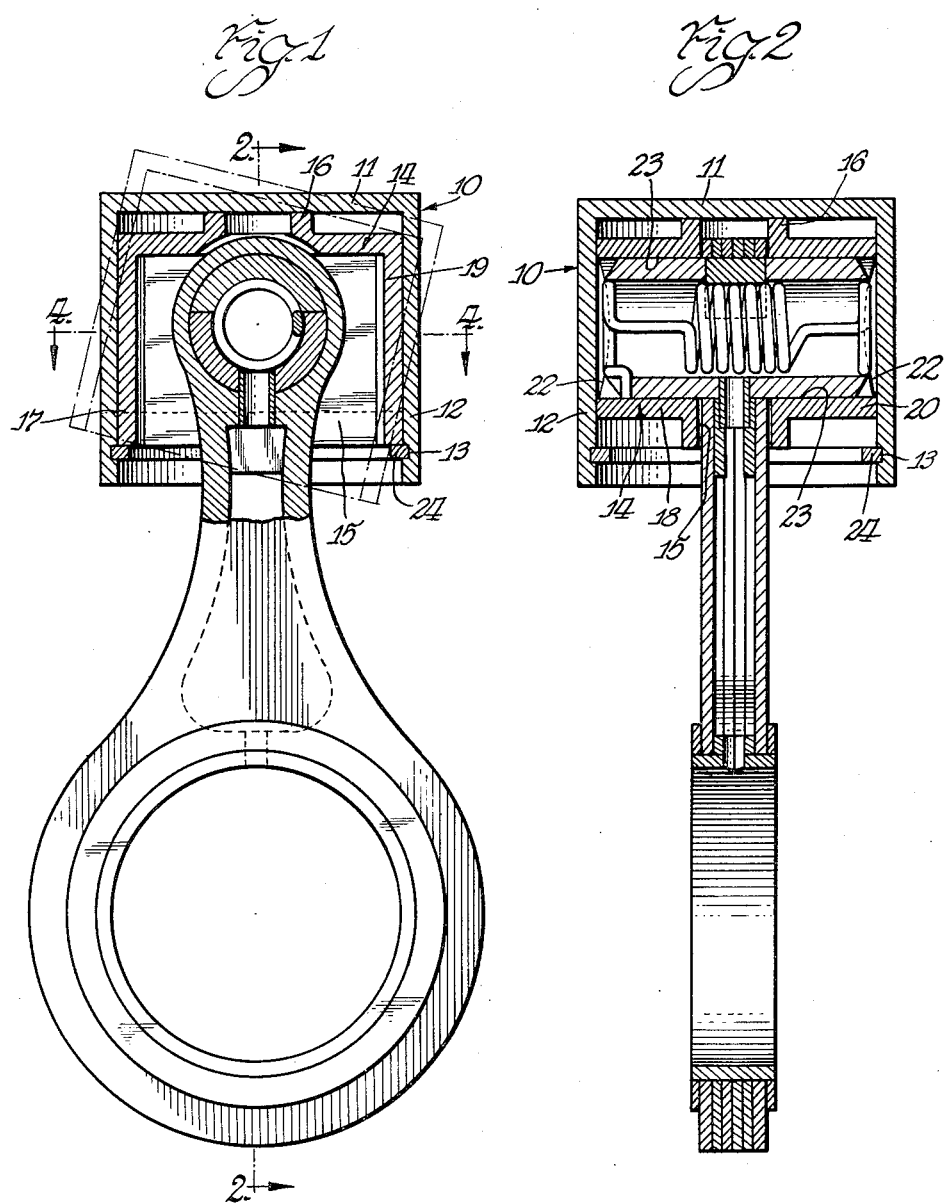
Inventors
John Calling
William E. Bongard
By Paul O. Pippel
Atty.

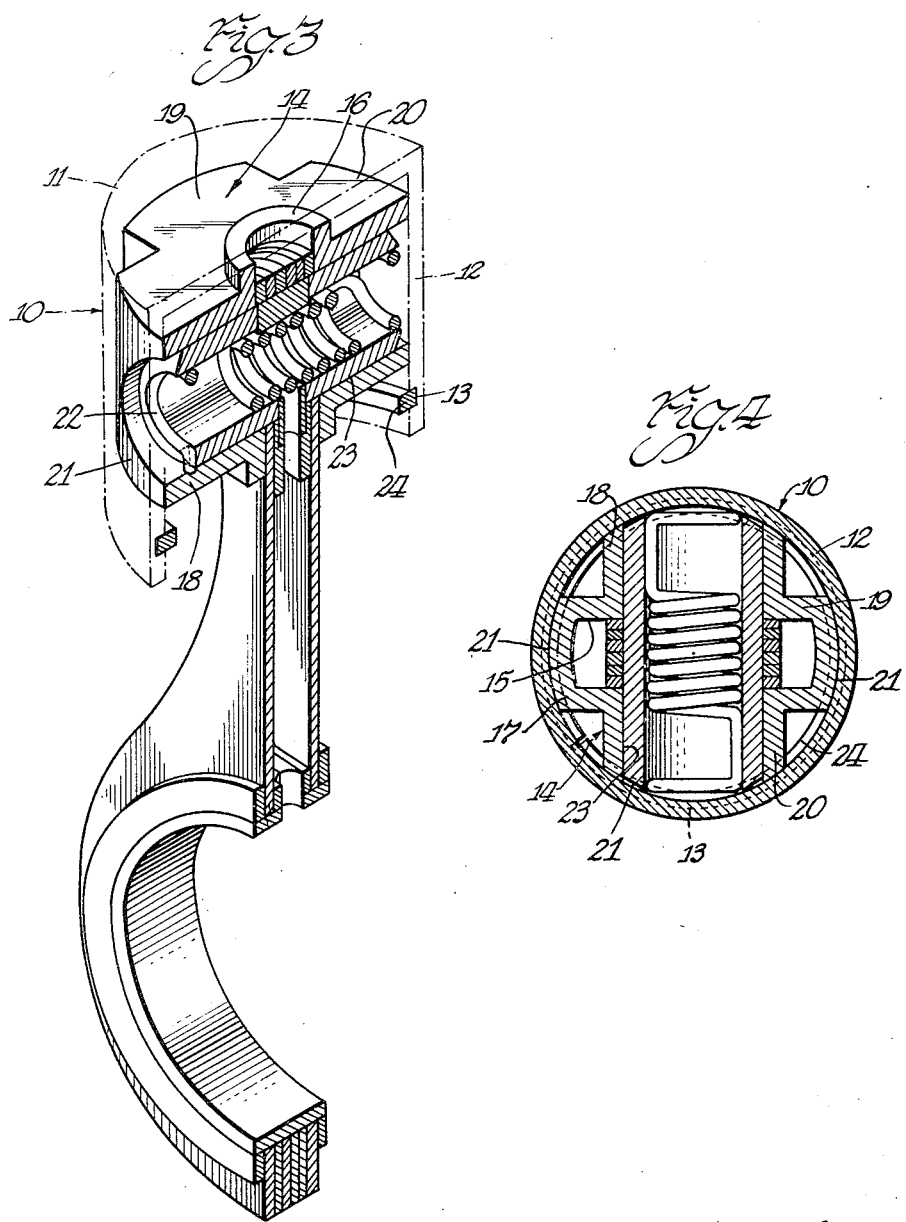

Patented Oct. 5, 1954

2,690,940

UNITED STATES PATENT OFFICE 2,690,940

PISTON ASSEMBLY

John Calling and William F. Borgerd, Evansville, Ind., assignors to International Harvester Company, a corporation of New Jersey Original application July 13, 1949, Serial No. 104,526. Divided and this application October 7, 1952, Serial No. 313,392

4 Claims. (Cl. 309—16)

This invention relates to an improved piston assembly for compressors and the like. More particularly it relates to a piston and a novel wrist-pin carrier construction and the improved connection between the parts. The present application is a division of applicant's co-pending application, Serial No. 104,526, filed July 13, 1949, for "Connecting Rod and Piston Assembly."

The conventional piston assembly generally comprises a piston having a head portion and a cylindrical skirt portion which has aligned transverse openings to provide wrist-pin bearings. A wrist-pin has its ends journalled in the wrist-pin bearings and a connecting rod is usually keyed to the wrist-pin intermediate its ends. In the case of a compressor or pump the connecting rod receives power from a rotatable crank shaft and transmits the power to the piston by way of the wrist-pin. The piston then compresses the gas or other fluid within the cylinder to a desired pressure.

Heretofore, it was necessary to employ elaborate means to obtain a high volumetric efficiency because the compressed gas has a tendency to leak between the piston and cylinder thereby reducing the ratio of the actual gas pumped with respect to the volume swept by the piston during its travel in the cylinder. Since the conventional piston has wrist-pin bearing openings in the piston skirt, the compressor efficiency, which is directly related to volumetric efficiency, is decreased by the escape of compressed gases from within the cylinder, through the wrist-pin bearing openings, to the crankcase. With this factor in mind, compressor manufacturers have increased the length of the piston skirt: i. e., the sealing surface to overcome this difficulty. Hence, one of the objects of the present invention is to provide a piston skirt which is imperforated and continuous so that for a given size cylinder and percentage compressor efficiency the length of the piston skirt may be decreased, and still maintain the desired degree of compressor efficiency.

Another object is to provide a novel wrist-pin carrier completely enclosed within the piston skirt.

A further object is a new and improved means for rigidly securing the wrist-pin carrier within the piston.

A still further object is to produce a piston assembly for compressors comprising a piston having a head portion which is slightly deformable outwardly along the longitudinal axis of the piston when the wrist-pin carrier is forced into the piston skirt. The bulged piston head acts as a resilient force tending to continually urge the carrier upon a retainer member carried by the piston and thus the connection between the piston and carrier will not become loose and noisy after long periods of use.

Still another object is the provision of a light weight, sturdy wrist-pin carrier.

The foregoing and other important objects and desirable features inherent in and encompassed by the invention, together with many of the purposes and uses thereof, will become more readily apparent from a reading of the ensuing description in conjunction with the annexed drawings, in which;

Figure 1 is a side elevational view showing the wrist-pin carrier and the piston in cross-section;

Figure 2 is a view similar to Figure 1 and taken substantially along line 2—2 of Figure 1;

Figure 3 is a perspective view in section of the piston assembly; and

Figure 4 is a plan sectional view taken substantially along the line 4—4 of Figure 1.

Referring to the drawings, wherein like reference characters represent like elements throughout the various views, there is shown a connecting rod and piston assembly. The piston 10 has a flat head portion 11 and a hollow cylindrical skirt portion or shell 12 integrally formed with the head portion. The skirt portion 12 has at the end opposite the head portion 11, an internal annular groove 13.

A cross-shaped wrist-pin carrier 14 is adapted to be wholly disposed within the hollow cylindrical skirt portion 12 and rigidly secured to the piston 10. The wrist-pin carrier 14 has a hollow central portion 15 and a plurality of circumferentially spaced radially disposed portions or bosses 17, 18, 19, and 20 having their outer surfaces rounded or contoured as shown at 21 to conform substantially to the contour of the interior wall of the piston skirt portion 12. The wrist-pin carrier 14 also has a central raised portion 16 which has a diameter considerably less than the internal diameter of the piston skirt portion 12. It will be noted that two of the radially disposed portions 18 and 20 are diametrically opposed and provided with transversely aligned openings 22 to define wrist-pin bearing surfaces.

In assembly, the wrist-pin carrier 14 is advanced within the piston skirt 12, applying a small amount of force until the raised portion 16 is in direct physical contact with the underside of the piston head portion 11. The piston head portion 11, being in the form of a flat plate having its marginal edge secured, is slightly deformable.

When sufficient force is applied longitudinally to the wrist-pin carrier 14 the piston head portion 11 is bulged outwardly a very small amount since the upward assembly force is concentrated about the center of the head portion 11. A resilient snap ring or retainer 24 is then slipped into groove 13. The snap ring 24 provides an internally extending seat for the lowermost surface of the wrist-pin carrier 14. By this construction of the piston and wrist-pin carrier and the method of assembly described above, the bulged piston head 11 which was stressed during assembly acts as a resilient force tending to continually urge the wrist-pin carrier 14 upon the ring 24. Thus, it will be apparent that a very rigid piston assembly is produced which will not become loose and noisy even after long periods of use.

The embodiment of the invention chosen for the purposes of illustration and description herein is that preferred for achieving the objects of the invention and developing the utility thereof in the most desirable manner, due regard being had to existing factors of economy, simplicity of design, and the improvements sought to be expected. It will be appreciated, therefore, that the particular structural and functional aspects emphasized herein are not intended to exclude but rather to suggest such other adaptations and modifications as fall within the spirit and scope of the invention as defined in the appended claims.

What is claimed is:

1. A piston assembly comprising a piston having a relatively flat head portion when disassembled capable of being deformed when assembled, said head portion closing one end of an imperforate cylindrical shell; a hollow wrist-pin carrier contained within said shell having a first pair of oppositely disposed portions contoured to conform to the interior wall of said shell and a second pair of oppositely disposed portions perpendicular to said first pair of portions, said second pair of portions having transversely aligned openings to provide wrist-pin bearing surfaces said carrier having a central circular raised portion, said raised portion having an outer diameter less than the radius of said head portion and being adapted to abut the underside of said head portion and bulge said head portion outwardly along the longitudinal axis of said shell away from the open end of said shell whereby said head portion tends to flatten and move said carrier longitudinally toward the open end of said shell; and retaining means engaging said shell and carrier for preventing said head portion from completely flattening to rigidly secure said carrier to said piston.

2. A piston assembly comprising a piston having a normally flat head portion when disassembled capable of being deformed when assembled, said head portion closing one end of an imperforate cylindrical shell having an internal annular groove located at the end opposite said head portion; a hollow wrist-pin carrier provided with wrist-pin holes and having a central circular raised portion, said raised portion having an outer diameter less than the radius of said head portion and being adapted to abut the underside of said head portion and bulge said head portion outwardly along the longitudinal axis of said shell whereby said head portion tends to flatten and assume its normal condition and move said carrier downwardly along the longitudinal axis of said shell; and a retainer comprising a split resilient ring expanded into said groove and abutting the bottom surface of said carrier whereby said head portion is prevented from completely flattening and said carrier is rigidly held between said retainer and said head portion.

3. A piston assembly comprising a piston having a flat head portion capable of being deformed, said head portion closing one end of an imperforate cylindrical shell having an internal annular groove located at the end opposite said head portion; a hollow wrist-pin carrier within said shell having circumferentially spaced, diametrically opposed bosses abutting the interior surface of said shell, two of said bosses being bored to provide wrist-pin bearings, said carrier having a central upper portion of smaller outer diameter than the internal diameter of said shell adapted to abut the underside of said head portion and bulge said head portion outwardly along the longitudinal axis of said shell whereby said head portion is stressed and acts as a compressed spring and tends to move said carrier downwardly along the longitudinal axis of said shell; and a retainer comprising a split resilient ring expanded into said groove and abutting the bottom surface of said carrier whereby said head portion is maintained in its bulged condition and said carrier is rigidly held between said retainer and said head portion.

4. A piston assembly comprising a piston having a normally flat head portion when disassembled, said head portion being capable of being deformed when assembled, said head portion closing one end of an imperforate cylindrical shell; a wrist-pin carrier provided with wrist-pin holes and having a central raised portion at one end thereof adapted to abut the underside of said head portion and bulge said head portion outwardly along the longitudinal axis of said shell away from the open end of said shell, the outer edge of said raised portion encircling an area which is less than one half of the total area of said head portion whereby said head portion tends to flatten and assume its normal condition and move said carrier downwardly along the longitudinal axis of said shell toward the open end thereof; and means for engaging said shell and carrier adjacent the open end of said shell for preventing said head portion from completely flattening to rigidly secure said carrier to said piston.

References Cited in the file of this patent

UNITED STATES PATENTS

| Number | Name | Date |
|---|---|---|
| 1,722,635 | Knight | July 30, 1929 |

FOREIGN PATENTS

| Number | Country | Date |
|---|---|---|
| 349,194 | France | Mar. 11, 1905 |
| 277,759 | Great Britain | Sept. 26, 1927 |